United States Patent
Narayanan et al.

(10) Patent No.: US 12,095,670 B2
(45) Date of Patent: Sep. 17, 2024

(54) THROTTLING NETWORK THROUGHPUT BASED ON A THROTTLING FACTOR

(71) Applicant: ARRIS Enterprises LLC, Suwanee, GA (US)

(72) Inventors: Muralidharan Narayanan, Karnataka (IN); Sathish Arumugam Chandrasekaran, Karnataka (IN); Jalagandeswari Ganapathy, Karnataka (IN); Anil Radhakrishnan, Karnataka (IN)

(73) Assignee: ARRIS ENTERPRISES LLC, Horsham, PA (US)

( * ) Notice: Subject to any disclaimer, the term of this patent is extended or adjusted under 35 U.S.C. 154(b) by 0 days.

(21) Appl. No.: 17/475,633

(22) Filed: Sep. 15, 2021

(65) Prior Publication Data
US 2022/0109635 A1   Apr. 7, 2022

Related U.S. Application Data

(60) Provisional application No. 63/087,434, filed on Oct. 5, 2020.

(51) Int. Cl.
*H04L 47/25* (2022.01)
(52) U.S. Cl.
CPC ................... *H04L 47/25* (2013.01)
(58) Field of Classification Search
CPC ..................................................... H04L 47/25
See application file for complete search history.

(56) References Cited

U.S. PATENT DOCUMENTS

| | | | |
|---|---|---|---|
| 10,051,555 B1* | 8/2018 | Melvin | H04L 1/0018 |
| 10,080,155 B1* | 9/2018 | Lee | H04L 41/5019 |
| 10,644,978 B2* | 5/2020 | Dillon | H04L 12/4641 |
| 2005/0163048 A1* | 7/2005 | Arora | H04L 47/21 370/230 |
| 2014/0146682 A1* | 5/2014 | Kakadia | H04L 47/805 370/238 |
| 2016/0337223 A1* | 11/2016 | Mackay | H04L 43/0888 |
| 2018/0048691 A1* | 2/2018 | Pruden | H04L 47/2433 |
| 2018/0366213 A1* | 12/2018 | Fidone | G16H 50/70 |

* cited by examiner

*Primary Examiner* — Moustafa M Meky
*Assistant Examiner* — Kidest Mendaye
(74) *Attorney, Agent, or Firm* — Wenderoth, Lind & Ponack, L.L.P.

(57) ABSTRACT

As network resources of a network continue to be stretched due to a variety of users and numerous network devices connected to the network, there is a need to provide management of the network resources to optimize access to the network and to provide enhanced QoE for each user of the network without diminishing a particular user's experience. A throttling management application can provide for throttling one or more requests for an asset associated with one or more network devices. A request can be throttled so as to bump higher priority requests in a queue ahead of other network requests based on a throttling factor. The throttling factor can be associated with a throttling management profile that provides a priority to certain requests of certain network devices without delaying requests from other network devices.

20 Claims, 6 Drawing Sheets

R3 bumped by
Throttling Factor of 3

FIG. 5B

R5 bumped by
Throttling Factor of 5

THROTTLING NETWORK THROUGHPUT BASED ON A THROTTLING FACTOR

BACKGROUND

Companies are increasingly providing Multiple Access Point (MAP) architecture or Home Network Controller (HNC) type of home wireless fidelity (Wi-Fi) management, with multiple access point devices and/or extender access point devices (collectively, network devices) within the home to improve Quality of Experience (QoE) of the user by offering extended coverage with seamless roaming. Access point devices and extender access point devices communicate with client devices using one or more RF channels. Typically, 5 GigaHertz (GHz) radio is used for Wi-Fi backhaul in extender access point devices because such offers more bandwidth with less interference and greater reliability when compared to 2.4 GHz radio.

Increasingly multiple users of multiple network devices are connecting to a network, for example, a home network. For example, users accessing network resources to work remotely at home, conduct and participate in virtual classes, partake in virtual learning, online shop, online network or socialize, stream entertainment, and any other type of experience available via a network connection. These multiple connections and various types of users with various demands on network resources can affect the network performance for all the users of a network. Generally, each user and/or network device is given the same access and priority to the network without regard to the type of application, network device, user, time of day, day of week, etc.

Therefore, there is a need to provide management of network resources to optimize access to the network and to provide enhanced QoE for each user of the network without diminishing a particular user's experience.

SUMMARY

Network environments, especially home network environments, can now serve multiple functions for various types of users, network devices, network applications, etc. For example, the same network can be required to support a variety of users and network devices such as remote working for extended hours, providing and/or receiving educational services, online shopping, consuming entertainment (such as streaming audio/video), participating in social or networking events, any other type of network access, or any combination thereof. Given these type of activities that include substantial reliance on Internet access and even increased demands to access network resources, it is becoming imperative to provide the best optimized access to the network for all users and/or network devices seeking access to the network. One or more novel solutions of the present disclosure provide throttling management such that certain network requests and/or responses are throttled so as to bump higher priority network requests/responses in a queue ahead of other network requests/responses based on a throttling factor. The throttling factor can be associated with certain type of network requests/responses to provide preference to a particular user without delaying requests from other users.

An aspect of the present disclosure provides an access point device of a network for providing throttling management. The access point device comprising a memory storing one or more computer-readable instructions, and a processor configured to execute the one or more computer-readable instructions to a processor configured to execute the one or more computer-readable instructions to receive a request for an asset from a client device, determine a throttling factor based, at least in part, on a throttling configuration, queue the request based on the throttling factor and send the request to a service provider based, at least in part, on the queueing.

In an aspect of the present disclosure, the processor of the access point device is further configured to execute the one or more instructions to send the request to a service provider based, at least in part, on the queueing.

In an aspect of the present disclosure, the throttling configuration comprises at least one of a throttling management parameter and a throttling management profile.

In an aspect of the present disclosure, the throttling management profile is associated with any of one or more users, one or more applications, one or more network devices, or a combination thereof.

In an aspect of the present disclosure, queueing the request based on the throttling factor comprises bumping the request by a factor indicated by the throttling factor.

In an aspect of the present disclosure, the processor of the access point device is configured to execute one or more further instructions to determine that throttling management is enabled.

In an aspect of the present disclosure, the processor of the access point device is configured to execute one or more further instructions to determine that a queue length supports queueing the request based on the throttling factor.

An aspect of the present disclosure provides a method for an access point device of a network to provide throttling management, the method comprising receiving a request for an asset from a client device, determining a throttling factor based, at least in part, on a throttling configuration, queueing the request based on the throttling factor, sending the request to a service provider based, at least in part, on the queueing.

In an aspect of the present disclosure, the method is such that the throttling configuration comprises at least one of a throttling management parameter and a throttling management profile.

In an aspect of the present disclosure, the method is such that the throttling management profile is associated with any of one or more user one or more applications, one or more network devices, or a combination thereof.

In an aspect of the present disclosure, the method is such that queueing the request based on the throttling factor comprises bumping the request by a factor indicated by the throttling factor.

In an aspect of the present disclosure, the method further comprises determining that throttling management is enabled.

In an aspect of the present disclosure, the method further comprises determining that a queue length supports queueing the request based on the throttling factor.

An aspect of the present disclosure provides a non-transitory computer-readable medium of an access point device storing one or more instructions for providing throttling management of a network. The one or more instructions when executed by a processor of the access point device, cause the access point device to perform one or more operations including the steps of the methods described above.

The above-described network device(s) or electronic apparatus(es), such as access point devices, extender access point devices, client devices and any other network devices, may be implemented as any of a residential network access point device, an electronic device (for example, a mobile phone, a computing device such as a notebook computer, or both) according to one or more embodiments.

Thus, according to various aspects of the present disclosure described herein, it is possible to provide throttling management for a network. The throttling management provides certain users, applications, client devices, etc. are given priority in a queue so as to ensure prompt handling of associated network requests and to ensure that the certain user have an enhanced QoE without causing delays and/or interruptions to access to network resource by other users, application, client devices, etc.

BRIEF DESCRIPTION OF DRAWINGS

In the drawings, like reference numbers generally indicate identical, functionally similar, and/or structurally similar elements.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the examples described herein can be made without departing from the spirit and scope of the present disclosure.

Figure 1:
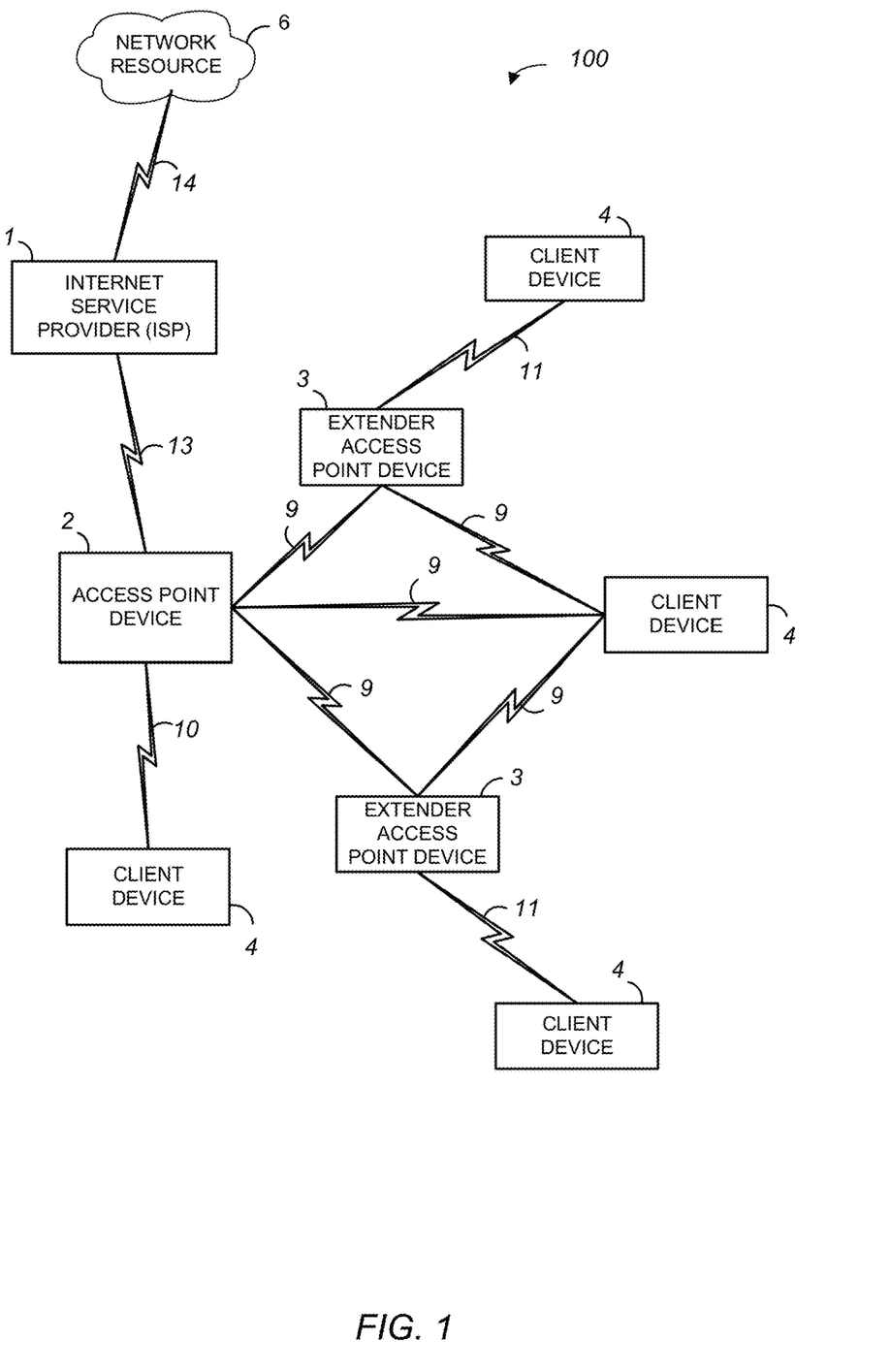
FIG. 1 is a schematic diagram of a network environment, according to one or more aspects of the present disclosure.

FIG. 1 is a schematic diagram of a network environment 100, according to one or more aspects of the present disclosure.

It should be appreciated that various example embodiments of inventive concepts disclosed herein are not limited to specific numbers or combinations of devices, and there may be one or multiple of some of the aforementioned electronic apparatuses or network devices in the network environment, which may itself consist of multiple communication networks and various known or future developed wireless connectivity technologies, protocols, devices, and the like.

As shown in FIG. 1, the main elements of the network environment 100 include a network comprising an access point device 2 connected to a network resource 6, such as a cloud-based repository, via an Internet Service Provider (ISP) 1 and also connected to different wireless devices or network devices such as one or more wireless extender access point devices 3 and one or more client devices 4. The network environment 100 shown in FIG. 1 includes wired and/or wireless network devices (e.g., extender access point devices 3 and client devices 4) that may be connected in one or more wireless networks (e.g., private, guest, iControl, backhaul network, or Internet of things (IoT) network) or one or more wired networks within the network environment 100. Additionally, there could be some overlap between network devices (e.g., extender access point devices 3 and client devices 4) in the different networks. That is, one or more network or wireless devices could be located in more than one network. For example, the extender access point devices 3 could be located both in a private network for providing content and information to a client device 4 and also included in a backhaul network or an iControl network.

Starting from the top of FIG. 1, the ISP 1 can be, for example, a content provider or any computer for connecting the access point device 2 to the network resource 6. For example, network resource 6 can be a cloud-based service that provides access to a cloud-based repository accessible via ISP 1 where the cloud-based repository comprises information associated with any one or more network devices of the network environment 100, for example, a throttling configuration for providing throttling management of the network environment 100. In one or more embodiments, network resource 6 can be associated with the provider of the access point device 2. The connection 14 between the network resource 6 and the ISP 1 and the connection 13 between the ISP 1 and the access point device 2 can be implemented using a wide area network (WAN), a virtual private network (VPN), metropolitan area networks (MANs), system area networks (SANs), a data over cable service interface specification (DOCSIS) network, a fiber optics network (e.g., FTTH (fiber to the home) or FTTX (fiber to the x), or hybrid fiber-coaxial (HFC)), a digital subscriber line (DSL), a public switched data network (PSDN), a global Telex network, or a 2G, 3G, 4G, 5G, or 6G network, for example.

The connection 13 can further include as some portion thereof a broadband mobile phone network connection, an optical network connection, or other similar connections. For example, the connection 13 can also be implemented using a fixed wireless connection that operates in accordance with, but is not limited to, 3rd Generation Partnership Project (3GPP) Long Term Evolution (LTE), 5G, or 6G protocols. It is also contemplated by the present disclosure that connection 13 is capable of providing connections between the access point device 2 and a WAN, a LAN, a VPN, MANs, PANs, WLANs, SANs, a DOCSIS network, a fiber optics network (e.g., FTTH, FTTX, or HFC), a PSDN, a global Telex network, or a 2G, 3G, 4G, 5G or 6G network, for example.

The access point device 2 can be, for example, an access point and/or a hardware electronic device that may be a combination modem and gateway that combines the functions of a modem, an access point (AP), and/or a router for providing content received from the ISP 1 to one or more network devices (e.g., wireless extender access point devices 3 and client devices 4) in the network environment 100. In one or more embodiments, the access point device 2 provides throttling management of the network so as to ensure that one or more user associated with any of the network devices is provided with an enhanced QoE. It is also contemplated by the present disclosure that the access point device 2 can include the function of, but is not limited to, a universal plug and play (UPnP) simple network management protocol (SNMP), an Internet Protocol/Quadrature Amplitude Modulator (IP/QAM) set-top box (STB) or smart media device (SMD) that is capable of decoding audio/video content, and playing over-the-top (OTT) or multiple system operator (MSO) provided content. The access point device 2 may also be referred to as a residential gateway, a home network gateway, or a wireless access point (AP).

The connection 9 between the access point device 2, the wireless extender access point devices 3, and client devices 4 can be implemented using a wireless connection in accordance with any IEEE 802.11 Wi-Fi protocols, Bluetooth protocols, BLE, or other short range protocols that operate in accordance with a wireless technology standard for exchanging data over short distances using any licensed or unlicensed band such as the citizens broadband radio service (CBRS) band, 2.4 GHz bands, 5 GHz bands, 6 GHz or 60 GHz bands. Additionally, the connection 9 can be implemented using a wireless connection that operates in accordance with, but is not limited to, RF4CE protocol, ZigBee protocol, Z-Wave protocol, or IEEE 802.15.4 protocol. It is also contemplated by the present disclosure that the connection 9 can include connections to a media over coax (MoCA) network. One or more of the connections 9 can also be a wired Ethernet connection. Any one or more of connections 9 can carry information on any of one or more channels that are available for use. In one or more embodiments, one or more network devices (such as any of the one or more extender access point devices 3, the one or more client device 4, or a combination thereof) are managed by access point device 2 such that access point device 2 can provide throttling management for the network.

The extender access point devices 3 can be, for example, wireless hardware electronic devices such as access points (APs), extenders, repeaters, etc. used to extend the wireless network by receiving the signals transmitted by the access point device 2 and rebroadcasting the signals to, for example, client devices 4, which may be out of range of the access point device 2. The extender access point devices 3 can also receive signals from the client devices 4 and rebroadcast the signals to the access point device 2, or other client devices 4.

The connection 11 between the extender access point devices 3 and the client devices 4 are implemented through a wireless connection that operates in accordance with any IEEE 802.11 Wi-Fi protocols, Bluetooth protocols, Bluetooth low energy (BLE), or other short range protocols that operate in accordance with a wireless technology standard for exchanging data over short distances using any licensed or unlicensed band such as the CBRS band, 2.4 GHz bands, 5 GHz bands, 6 GHz or 60 GHz bands. Additionally, the connection 11 can be implemented using a wireless connection that operates in accordance with, but is not limited to, RF4CE protocol, ZigBee protocol, Z-Wave protocol, or IEEE 802.15.4 protocol. Also, one or more of the connections 11 can be a wired Ethernet connection. Any one or more connections 11 can carry information on any one or more channels that are available for use.

The client devices 4 can be, for example, hand-held computing devices, personal computers, electronic tablets, mobile phones, smart phones, smart speakers, Internet-of-Things (IoT) devices, iControl devices, portable music players with smart capabilities capable of connecting to the Internet, cellular networks, and interconnecting with other devices via Wi-Fi and Bluetooth, or other wireless hand-held consumer electronic devices capable of executing and displaying content received through the access point device 2, for example, based on a request from a client device 4. Additionally, the client devices 4 can be a television (TV), an IP/QAM set-top box (STB) or a streaming media decoder that is capable of decoding audio/video content, and playing over OTT or MSO provided content received through the access point device 2. Further, a client device 4 can be a network device for which a throttling setting has been enabled such that access point device 2 provides throttling management of one or more requests from the client device 2.

The connection 10 between the access point device 2 and the client device 4 is implemented through a wireless connection that operates in accordance with, but is not limited to, any IEEE 802.11 protocols. Additionally, the connection 10 between the access point device 2 and the client device 4 can also be implemented through a WAN, a LAN, a VPN, MANs, PANs, WLANs, SANs, a DOCSIS network, a fiber optics network (e.g., FTTH, FTTX, or HFC), a PSDN, a global Telex network, or a 2G, 3G, 4G or 5G network, for example.

The connection 10 can also be implemented using a wireless connection in accordance with Bluetooth protocols, BLE, or other short range protocols that operate in accordance with a wireless technology standard for exchanging data over short distances using any licensed or unlicensed band such as the CBRS band, 2.4 GHz bands, 5 GHz bands, 6 GHz or 60 GHz bands. One or more of the connections 10 can also be a wired Ethernet connection.

Figure 2:
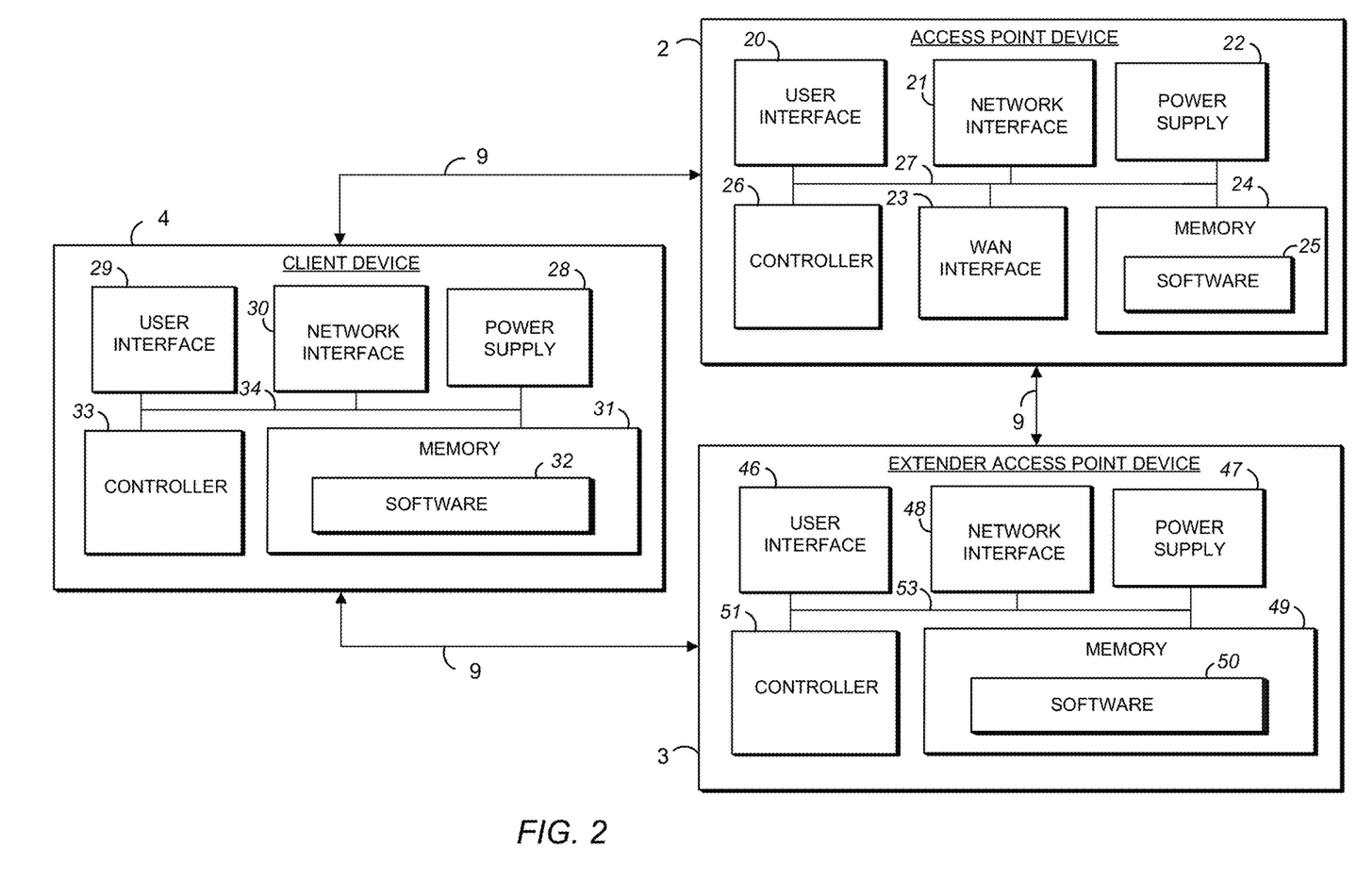
FIG. 2 is a more detailed block diagram illustrating various components of an exemplary access point device, client device, and extender access point device implemented in the network environment of FIG. 1, according to one or more aspects of the present disclosure.

A detailed description of the exemplary internal components of the access point device 2, the extender access point devices 3, and the client devices 4 shown in FIG. 1 will be provided in the discussion of FIG. 2. However, in general, it is contemplated by the present disclosure that the access point device 2, the extender access point devices 3, and the client devices 4 include electronic components or electronic computing devices operable to receive, transmit, process, store, and/or manage data and information associated with the network environment 100, which encompasses any suitable processing device adapted to perform computing tasks consistent with the execution of computer-readable instructions stored in a memory or a computer-readable recording medium (e.g., a non-transitory computer-readable medium).

Further, any, all, or some of the computing components in the access point device 2, the extender access point devices 3, and the client devices 4 may be adapted to execute any operating system, including Linux, UNIX, Windows, MacOS, DOS, and ChromOS as well as virtual machines adapted to virtualize execution of a particular operating system, including customized and proprietary operating systems. The access point device 2, the extender access point devices 3, and the client devices 4 are further equipped with components to facilitate communication with other computing devices or network devices over the one or more network connections to local and wide area networks, wireless and wired networks, public and private networks, and any other communication network enabling communication in the network environment 100.

FIG. 2 is a more detailed block diagram illustrating various components of an exemplary access point device, client device, and wireless extender implemented in the network environment 100 of FIG. 1, according to one or more aspects of the present disclosure.

Although FIG. 2 only shows one extender access point device 3 and one client device 4, the extender access point device 3 and the client device 4 shown in the figure are meant to be representative of the other extender access point devices 3 and client devices 4 of a network system, for example, network environment 100 shown in FIG. 1. Similarly, the connections 9 between the access point device 2, the extender access point device 3, and the client device 4 shown in FIG. 2 are meant to be exemplary connections and are not meant to indicate all possible connections between the access point devices 2, extender access point devices 3, and client devices 4. Additionally, it is contemplated by the present disclosure that the number of access point devices 2, extender access point devices 3, and client devices 4 is not limited to the number of access point devices 2, extender access point devices 3, and client devices 4 shown in FIGS. 1 and 2.

Now referring to FIG. 2 (e.g., from left to right), the client device 4 can be, for example, a computer, a portable device, an electronic tablet, an e-reader, a PDA, a mobile phone such as a smart phone, a smart speaker, an IoT device, an iControl device, portable music player with smart capabilities capable of connecting to the Internet, cellular networks, interconnecting with other devices via Wi-Fi and Bluetooth, or other wireless hand-held consumer electronic device capable of executing and displaying the content received through the access point device 2, or any other network device. Additionally, the client device 4 can be a TV, an IP/QAM STB, or an SMD that is capable of decoding audio/video content, and playing over OTT or MSO provided content received through the access point device 2.

As shown in FIG. 2, the client device 4 includes a power supply 28, a user interface 29, a network interface 30, a memory 31, and a controller 33.

The power supply 28 supplies power to the internal components of the client device 4 through the internal bus 34. The power supply 28 can be a self-contained power source such as a battery pack with an interface to be powered through an electrical charger connected to an outlet (e.g., either directly or by way of another device). The power supply 28 can also include a rechargeable battery that can be detached allowing for replacement such as a nickel-cadmium (NiCd), nickel metal hydride (NiMH), a lithium-ion (Li-ion), or a lithium Polymer (Li-pol) battery.

The user interface 29 includes, but is not limited to, push buttons, a keyboard, a keypad, a liquid crystal display (LCD), a thin film transistor (TFT), a light-emitting diode (LED), a high definition (HD) or other similar display device including a display device having touch screen capabilities so as to allow interaction between a user and the client device 4, for example, for a user to enter any one or more settings that are stored in memory 31. In one or more embodiments, user interface 29 provides an interface for a user, such as a graphical user interface, to interact with a throttling management application, for example, software 25 of access point device 2, to configure a throttling configuration. The network interface 30 can include, but is not limited to, various network cards, interfaces, and circuitry implemented in software and/or hardware to enable communications with the access point device 2 and the extender access point device 3 using any one or more of the communication protocols in accordance with connection 9 (e.g., as described with reference to FIG. 1).

The memory 31 includes a single memory or one or more memories or memory locations that include, but are not limited to, a random access memory (RAM), a dynamic random access memory (DRAM) a memory buffer, a hard drive, a database, an erasable programmable read only memory (EPROM), an electrically erasable programmable read only memory (EEPROM), a read only memory (ROM), a flash memory, logic blocks of a field programmable gate array (FPGA), a hard disk or any other various layers of memory hierarchy. The memory 31 can be used to store any type of instructions, software, or algorithms including software 32 for controlling the general function and operations of the client device 4 in accordance with the embodiments described in the present disclosure. In one or more embodiments, memory 31 can store any one or more settings associated with a client device 4 that allow the access point device 2 to control, configure and/or maintain a network connection with the client device 2, such as a throttling setting that indicates that throttling management is enabled or disabled for the client device 4. In one or more embodiments, client device 4 is a network device, such as a mobile phone, and software 32 includes one or more instructions for establishing a connection with the access point device 2 and/or an extender access point device 3 such that one or more requests, for example, a request associated with an application, software, etc. for an asset, can be sent to ISP 1, received from ISP 1, or both. An asset can include any of data, information, an application, a program, a login, a directory, a file structure, a device setting and/or configuration, content (for example, audio content, video content, and/or audio/video content), any other type of information sent to ISP 1, received from ISP 1, or both, or a combination thereof.

The controller 33 controls the general operations of the client device 4 and includes, but is not limited to, a central processing unit (CPU), a hardware microprocessor, a hardware processor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software including the software 32 for controlling the operation and functions of the client device 4 in accordance with the embodiments described in the present disclosure. Communication between the components (e.g., 28-31 and 33) of the client device 4 may be established using an internal bus 34.

In one or more embodiments, software 32 includes a configuration application that allows a user to interface with the throttling management application of access point device 2 or any other application, for example, via user interface 29 to configure one or more throttling configurations, the throttling setting 310, or both as discussed with reference to FIG. 3. The user can have the required credentials, password or authentication to update, create, delete, or any other access one or more throttling configurations. The user can set up one or more throttling management profiles, one or more throttling management parameters, one or more throttling factors, or any combination thereof as discussed with reference to FIG. 3. In one or more embodiments, the configuration application can store the one or more throttling configurations at the access point device 2, the network resource 6, or any combination thereof. In one or more embodiments, the configuration application can also restore any one or more throttling configurations by retrieving the one or more throttling configurations from a network resource 6, the access point device 2, any other storage medium, or a combination thereof. For example, if the access point device 2 is replaced, rebooted, reprogrammed or any other action that requires an update such that access point device 2 loses the one or more throttling configurations, the configuration application can retrieve the one or more throttling configurations from the network resource 6 and restore the one or more throttling configurations at the access point device 2. In one or more embodiments, the restoration can work in reverse, that is, the one or more throttling configurations can be restored at the network resource 6 from one or more throttling configurations retrieved from the access point device by the configuration application.

The extender access point device 3 can be, for example, any wireless hardware electronic device used to extend a wireless network by receiving the signals transmitted by the access point device 2 and rebroadcasting the signals to any one or more client devices 4, which may be out of range of the access point device 2 including, but not limited to, a wireless extender, a repeater, and/or an access point. The extender access point device 3 can also receive signals from any one or more of the client devices 4 and rebroadcast the signals to the access point device 2 or any other one or more client devices 4.

As shown in FIG. 2, the extender access point device 3 includes a user interface 46, a power supply 47, a network interface 48, a memory 49, and a controller 51.

The user interface 46 can include, but is not limited to, push buttons, a keyboard, a keypad, an LCD, a TFT, an LED, an HD or other similar display device including a display device having touch screen capabilities so as to allow interaction between a user and the extender access point device 3, for example, for a user to enter any one or more throttling settings stored in memory 49.

The power supply 47 supplies power to the internal components of the wireless extender access point device 3 through the internal bus 53. The power supply 47 can be connected to an electrical outlet (e.g., either directly or indirectly by way of another device) via a cable or wire.

The network interface 48 can include various network cards, interfaces, and circuitry implemented in software and/or hardware to enable communications with the client device 4 and the access point device 2 using the communication protocols in accordance with connection 9 (e.g., as described with reference to FIG. 1). For example, the network interface 48 can include multiple radios or sets of radios (e.g., a 2.4 GHz radio, one or more 5 GHz radios, and/or a 6 GHz radio), which may also be referred to as wireless local area network (WLAN) interfaces. One radio or set of radios (e.g., 5 GHz and/or 6 GHz radio(s)) provides a backhaul connection between the wireless extender access point device 3 and the access point device 2, and optionally other wireless extender access point device(s) 3. Another radio or set of radios (e.g., 2.4 GHz, 5 GHz, and/or 6 GHz radio(s)) provides a fronthaul connection between the extender access point device 3 and one or more client device(s) 4. In one or more embodiments, any one or more extender access point devices 3 utilize a protocol different than that of the access point device 2.

The memory 49 can include a single memory or one or more memories or memory locations that include, but are not limited to, a RAM, a DRAM, a memory buffer, a hard drive, a database, an EPROM, an EEPROM, a ROM, a flash memory, logic blocks of an FPGA, hard disk or any other various layers of memory hierarchy. The memory 49 can be used to store any type of instructions, software, or algorithm including software 50 associated with controlling the general functions and operations of the wireless extender access point device 3 in accordance with the embodiments described in the present disclosure. In one or more embodiments, extender access point device 3 is a network device and software 50 includes one or more instructions for establishing a connection with the access point device 2 and/or a client device 4.

The controller 51 controls the general operations of the wireless extender access point device 3 and can include, but is not limited to, a CPU, a hardware microprocessor, a hardware processor, a multi-core processor, a single core processor, an FPGA, a microcontroller, an ASIC, a digital signal processor (DSP), or other similar processing device capable of executing any type of instructions, algorithms, or software for controlling the operation and functions of the wireless extender access point device 3 in accordance with the embodiments described in the present disclosure. General communication between the components (e.g., 46-51) of the extender access point device 3 may be established using the internal bus 53.

The access point device 2 can be, for example, a hardware electronic device that can combine one or more functions of any of a modem, a gateway, an access point (AP), a router, or combinations thereof for providing content received from the content provider (ISP) 1 to network or wireless devices (e.g., extender access point devices 3, client devices 4) in the system. It is also contemplated by the present disclosure that the access point device 2 can include the function of, but is not limited to, an IP/QAM STB or SMD that is capable of decoding audio/video content, and playing OTT or MSO provided content.

As shown in FIG. 2, the access point device 2 includes a user interface 20, a network interface 21, a power supply 22, a wide area network (WAN) interface 23, a memory 24, and a controller 26.

The user interface 20 can include, but is not limited to, one or more push buttons, a keyboard, a keypad, an LCD, a TFT, an LED, an HD or other similar display device including a display device having touch screen capabilities so as to allow interaction between a user and the access point device 2. In one or more embodiments, the user interface 20 provides an interface, such as a command-line interface, a graphical user interface, an application programming interface (API), an interface output port for connection to a display, and/or an other type of user interface, that allows a user to enter one or more settings associated with any one or more network devices including, but not limited to, a client device 4 and/or an extender access point device 3 so as to provide throttling management. In one or more embodiments, access point device 2 communicates a throttling configuration to a network resource 6, as discussed with reference with FIG. 3. In one or more embodiments, access point device 2 stores in memory 24 a throttling configuration associated with the network, as discussed with reference to FIG. 3. In one or more embodiments, user interface 20 interfaces with a software 25, such as a throttling management application.

The network interface 21 may include various network cards, and circuitry implemented in software and/or hardware to enable communications with the extender access point device 3 and the client device 4 using the communication protocols in accordance with connection 9 (e.g., as described with reference to FIG. 1). Additionally, the various network cards, interfaces, and circuitry of the network interface 21 enable communications with a client device 4 (e.g., a mobile device) using the one or more communication protocols in accordance with connection 10 (e.g., as described with reference to FIG. 1). For example, the network interface 21 can include an Ethernet port (also referred to as a LAN interface) and multiple radios or sets of radios (e.g., a 2.4 GHz radio, one or more 5 GHz radios, and/or a 6 GHz radio, also referred to as WLAN interfaces). One radio or set of radios (e.g., 5 GHz and/or 6 GHz radio(s)) provides a backhaul connection between the access point device 2 and the wireless extender access point device(s) 3. Another radio or set of radios (e.g., 2.4 GHz, 5 GHz, and/or 6 GHz radio(s)) provides a fronthaul connection between the access point device 2 and one or more client device(s) 4. In one or more embodiments, the network interface 21 interfaces with a network resource 6. In one or more embodiments, network resource 6 can be local to and/or remote from the access point device 2.

The power supply 22 supplies power to the internal components of the access point device 2 through the internal bus 27. The power supply 22 can be connected to an electrical outlet (e.g., either directly or by way of another device) via a cable or wire.

The wide area network (WAN) interface 23 may include various network cards, and circuitry implemented in software and/or hardware to enable communications between the access point device 2 and the ISP 1 using the wired and/or wireless protocols in accordance with connection 13 (e.g., as described with reference to FIG. 1).

The memory 24 includes a single memory or one or more memories or memory locations that include, but are not limited to, a RAM, a DRAM, a memory buffer, a hard drive, a database, an EPROM, an EEPROM, a ROM, a flash memory, one or more logic blocks of a FPGA, hard disk or any other various layers of memory hierarchy. The memory 24 can be a non-transitory computer-readable storage medium used to store any type of instructions, software, or algorithm including software 25 for providing throttling management related to one or more network devices (for example, one or more wireless extender access point devices 3 and one or more client devices 4) in the network in accordance with the embodiments described in the present disclosure, for example, throttling a request from a client device 4. In one or more embodiments, the throttling management comprises receiving during a setup of the throttling management a throttling configuration and throttling a request from/to a client device 4 based on the throttling configuration.

The controller 26 controls the general operations of the access point device 2 as well as performs throttling management related to the other network devices (wireless extender access point devices 3 and client device 4) in the network including throttling one or more requests associated with one or more network devices based, at least in part, on a throttling configuration. The controller 26 can include, but is not limited to, a central processing unit (CPU), a network controller, a hardware microprocessor, a hardware processor, a multi-core processor, a single core processor, a FPGA, a microcontroller, an ASIC, a DSP, or other similar processing device capable of executing any type of instructions, algorithms, or software including the software 25 for throttling management in accordance with the embodiments described in the present disclosure. Communication between the components (e.g., 20-24, and 26) of the access point device 2 may be established using the internal bus 27. The controller 26 may also be referred to as a processor, generally.

Figure 3:
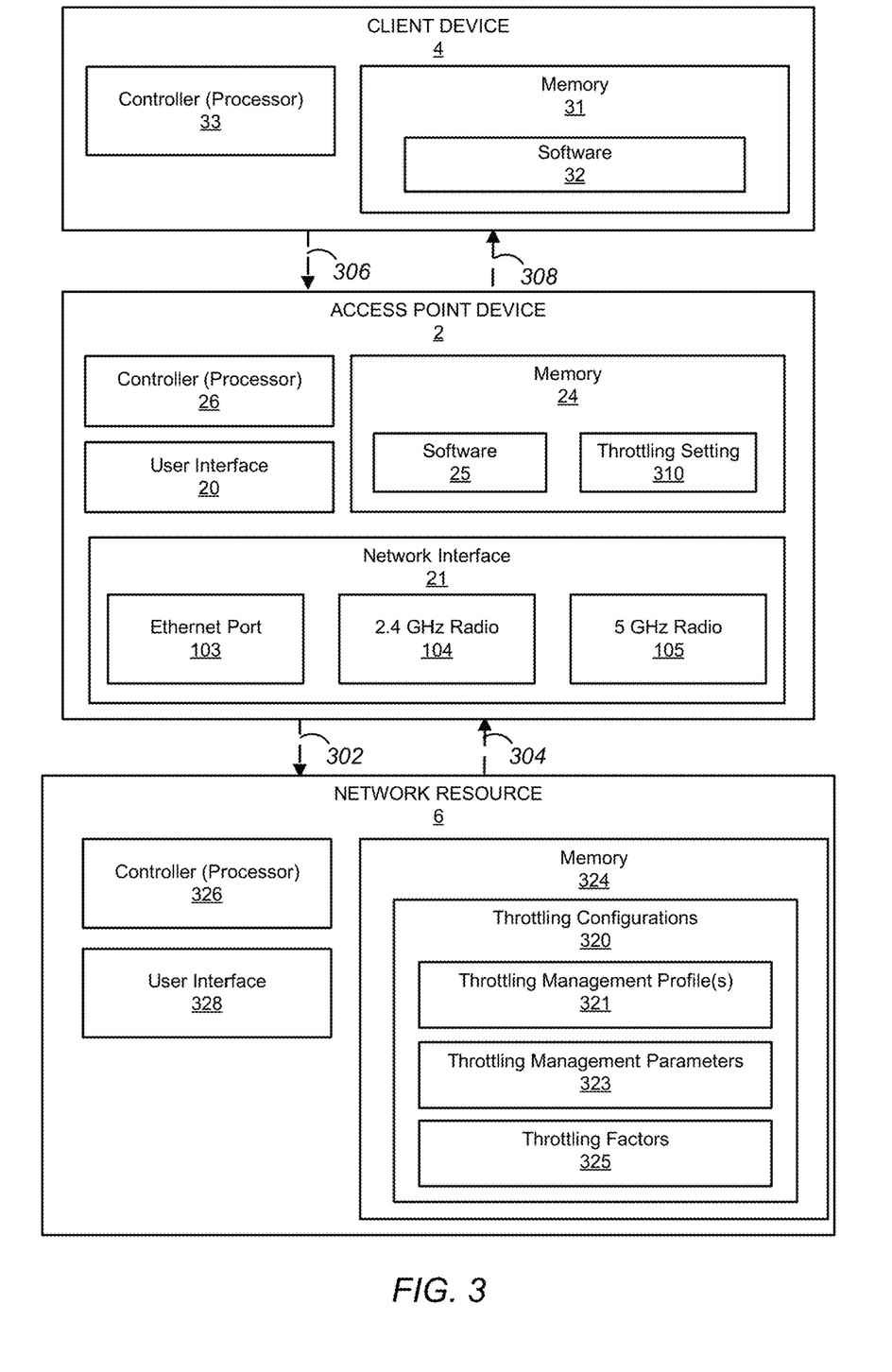
FIG. 3 is a more detailed block diagram illustrating certain components implemented in the network environment of FIGS. 1-2 for providing throttling management of a network, according to one or more aspects of the present disclosure.

FIG. 3 is a more detailed block diagram illustrating certain components of an exemplary access point device 2 implemented in the network environment of FIG. 1 and in FIG. 2, according to one or more aspects of the present disclosure.

As shown in FIG. 3, the access point device 2 includes the network interface 21, the memory 24, the user interface 20, and the controller (processor) 26.

The network interface 21 includes an Ethernet port 103 (e.g., a wired LAN interface), a 2.4 GHz radio 104 and a 5 GHz radio 105 (e.g., wireless LAN interfaces, or WLAN interfaces). The access point device 2 may communicate with the local area network devices (e.g., one or more extender access point devices 3, one or more client devices 4, and/or any other network device) of a network, for example, network environment 100 of FIG. 1, via one or more of the Ethernet port 103, the 2.4 GHz radio 104, and/or the 5 GHz radio 105. However, some other example embodiments of inventive concepts of the present disclosure are not limited to these interfaces only (e.g., the techniques may be applied with a 6 GHz radio or other similar future developed technologies). As mentioned above, according to aspects of the present disclosure, one radio or set of radios can operate as a backhaul radio to provide a backhaul connection between the access point device 2 and the wireless extender access point device(s) 3, while another radio or set of radios can provide a fronthaul connection between the access point device 2 and the client device(s) 4.

The memory 24 includes a software 25, such as a throttling management application, that provides throttling management of one or more network devices coupled to the access point device 2 of a network. The software 25 may be implemented as part of the one or more instructions, one or more algorithms, or software described above with reference to FIG. 2. The memory 24 can also store information associated with the throttling management and/or throttling management application, for example, a throttling setting 310. Throttling setting 310 can indicate whether throttling management is enabled for any of the access point device 2, any one or more client devices 4, any other network device, or a combination thereof. In one or more embodiments, a user can set the throttling setting 310 via a user interface 20. For example, a throttling setting 310 can be a Boolean value indicative of throttling management being enabled (e.g., a "1") or disabled (e.g., a "0"). The throttling management application can determine based, at least in part, on the throttling setting 310 how throttling should be applied within the network. For example, if throttling setting 310 indicates that throttling management is enabled, then one or more requests to and/or for one or more network resources associated with an asset will be filtered through the throttling management application based, at least in part, on a throttling configuration 320 as discussed with reference to network resource 6.

The controller 26 includes a processor that is configured to access the memory 24, perform the one or more management functions (e.g., via execution of the software 25). The processor of the controller 26 also controls communications with the network or network devices (e.g., the wireless extender access point devices 3, the client devices 4) via the Ethernet port 103, the 2.4 GHz radio 104, and/or the 5 GHz radio 105 in accordance with embodiments described in the present disclosure. The controller 26 can execute the one or more computer-readable instructions of the software 25, for example, the throttling management application, that cause the access point device 2 to perform one or more operations as discussed with reference to one or more embodiments.

In one or more embodiments, the network interface 21 interfaces with a network resource 6 that is remote from the access point device 2. For example, the access point device 2 can transmit a request 302, via a network interface 21, to network resource 6 and can receive a response 304, via the network interface 21, such as by utilizing connection 13 to ISP 1 and connection 14 to network resource 6 as discussed with reference to FIG. 1.

In one or more embodiments, the network resource 6 can comprise a computing device (e.g., a server, a computer, an electronic device, and/or any other network device), a website, a repository or library such as a database, data structure, or a flat-file system, a web page, a backend processing system, a cloud-based resource, any other resource that can store and communicate information, or any combination thereof. Network resource 6 can comprise a controller 326 (e.g. a processor or CPU) that executes one or more computer-readable instructions stored in a memory 324 to receive a request 302 and provide a response 304. In one or more embodiments, the request 302 can comprise one or more commands or instructions to store one or more throttling configurations 320, update one or more throttling configurations 320, perform a query so as to receive one or more throttling configurations 320, interface with a user interface 328 (such as an application programming interface (API)) to access one or more throttling configurations 320, or a combination thereof. In one or more embodiments, the response 304 can comprise a throttling configuration 320, a confirmation, or both.

In one or more embodiments, one or more throttling configurations 320 can be associated with a network provided by an access point device 2. A throttling configuration 320 can comprise a throttling management profile 321, one or more throttling management parameters 323, a throttling factor 325, or a combination thereof. In one or more embodiments, any one or more access point devices 2 can be associated with one or more throttling configurations 320 such that each network associated with an access point device 2 can be associated with a unique throttling configuration 320, one or more throttling configurations 320, or both. For example, network resource 6 can store a throttling configuration 320 for use by a throttling management application of access point device 2. In one or more embodiments, the throttling setting 310 and/or the throttling configuration 320 is stored locally at the access point device 2, remotely at the network resource 6, at both the access point device 2 and the network resource 6 (for example, the throttling setting 310 and/or the throttling configuration 320 stored at the access point device 2 is mirrored at the network resource 6 so as to allow for provisioning of the access point device 2 should a reset or reconfiguration of access point device 2 be required), or any combination thereof.

In one or more embodiments, a throttling configuration 320 can include a default throttling configuration, a primary throttling configuration, a secondary throttling configuration, any other throttling configuration, or a combination thereof. A default throttling configuration can be set by any of a manufacturer, service provider, an administrator, a third-party installer, any other type of user or entity, or any combination thereof. A primary throttling configuration can provide throttling information associated with a particular time of day, day of week, etc. For example, a primary throttling configuration can be associated with core business hours, such as from 8:00 A.M. to 5:00 P.M. on weekdays. A secondary throttling configuration can provide throttling information associated with a weekend, nighttime, or any other low demand for network resources. Any one or more throttling configurations 320 can be created for a network environment so as to provide throttling management based, at least in part, the user and/or network device requirements within the network environment.

In one or more embodiments, a throttling configuration 320 comprises any of one or more throttling management profiles 321, one or more throttling management parameters 323, a throttling factor 325, any other throttling information, or a combination thereof. A throttle management profile 321 can comprise one or more profiles associated with a user, a group of users, a network device, a group of network devices, an application, an application suite, an area or location, any other identifier, or a combination thereof. The one or more throttling management parameters 323 can comprise any of a unique identifier corresponding to a throttling management profile 321, one or more users, one or more applications, one or more types of data, one or more network devices, a date, a time, or any combination thereof.

In one or more embodiments, a throttling factor 325 or identifier may comprise any type of value indicative of a placement in a queue of a request 306 from a client device 4 to access an asset, a response 308 from a client device 4 to a request 306, or both. In one or more embodiments, the one or more throttling management parameters 323 can be associated with a throttling factor 325, the throttling factor 325 can be stored in a different location in memory 324 as shown in FIG. 3, or stored in any other location, for example, any of the one or more throttling configurations 320 can be stored at access point device 2 such that network resource 6 is not required. In one or more embodiments, the throttling factor 325 can be a numerical value, such as illustrated in TABLE 1 where a throttling factor of "1" indicates no throttling and a throttling factor of "5" indicates a 500 millisecond (ms) bump.

TABLE 1

| Throttling Factor (Numerical Value) | Throttling Factor Bump (ms) |
|---|---|
| 1 | None |
| 2 | 200 |
| 3 | 300 |
| 4 | 400 |
| 5 | 500 |

Figure 5A:
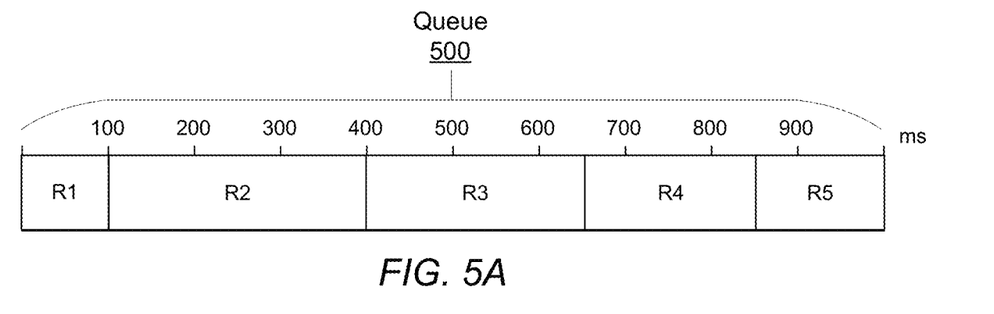
FIGS. 5A-C illustrate an exemplary queue of a network environment, according to one or more aspects of the present disclosure.
Figure 5B:
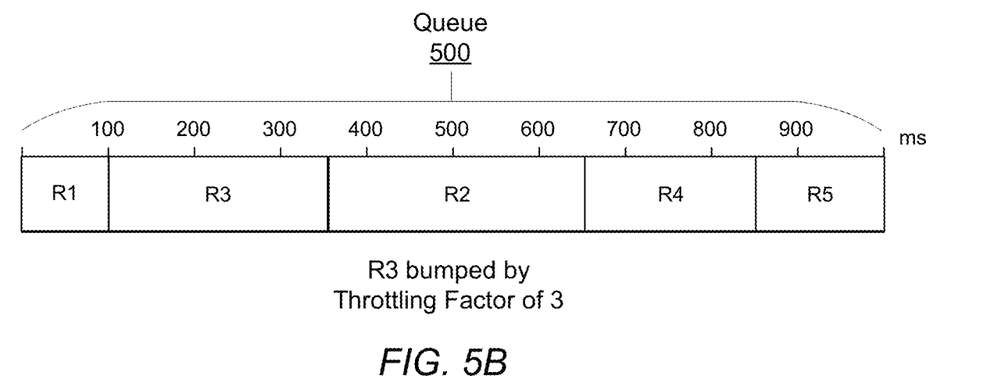
Figure 5C:
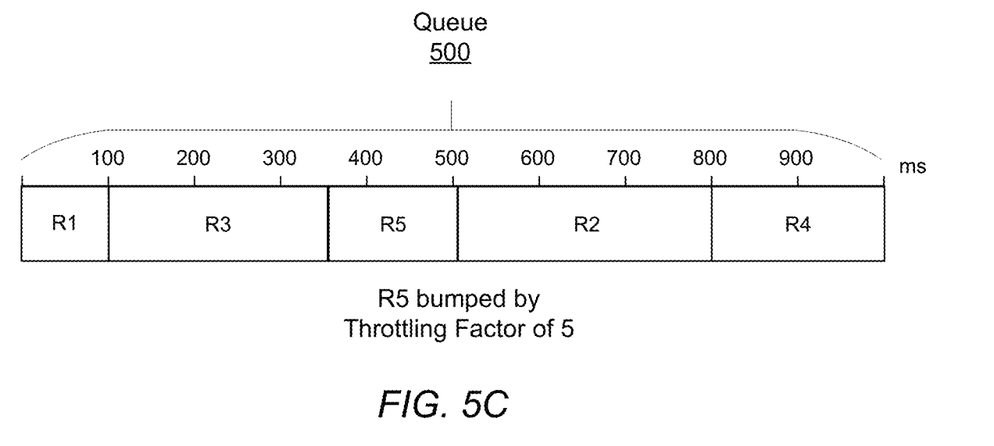

For example, as illustrated in FIGS. 5A-5C, a request or response can be positioned in a queue 500 with a queue length of 1000 ms based, at least in part, on a throttling factor 325, such as the one or more throttling factors as illustrated in Table 1. FIG. 5A illustrates the queue 500 with five responses and/or requests R1-R5 with each having an associated length, such as R1 having a length of 100 ms and positioned at the head of the queue. FIG. 5A shows a queue 500 where a throttling factor 325 has a value of "1" and no adjustments are made to the queue 500. FIG. 5B illustrates the queue 500 where the associated throttling configuration 320 comprises a throttling profile 321 with a throttling factor 325 of "3" indicative of a 300 ms bump for requests associated with a throttling parameter 323 should be given priority. As the queue length of queue 500 allows for bumping based on a throttling factor 325 of "3" R3 is bumped in the queue 500 by 300 ms. FIG. 5C illustrates the queue 500 where the associated throttling configuration 320 comprises a throttling profile 321 with a corresponding throttling factor 325 of "3" for requests associated with a first throttling parameter 323 ("R3") and a throttling factor 325 of "5" indicative of a 500 ms bump for requests associated with a second throttling parameter 323 ("R5"). As the queue length 500 has a queue length sufficient to support a bumping of 300 ms and 500 ms, the requests R3 and R5 can be bumped as shown in FIG. 5C.

As an example, a throttling management application can determine that a throttling management profile 321 is associated with an office suite of applications where the associated one or more throttling management parameters 323 indicate a throttling factor 325 should be applied Monday through Friday to any request or response associated with the office suite of applications. The throttling management application then throttles such requests or responses during the week but not on the weekends when, typically, demand for one or more network resources is not critical.

Figure 4:
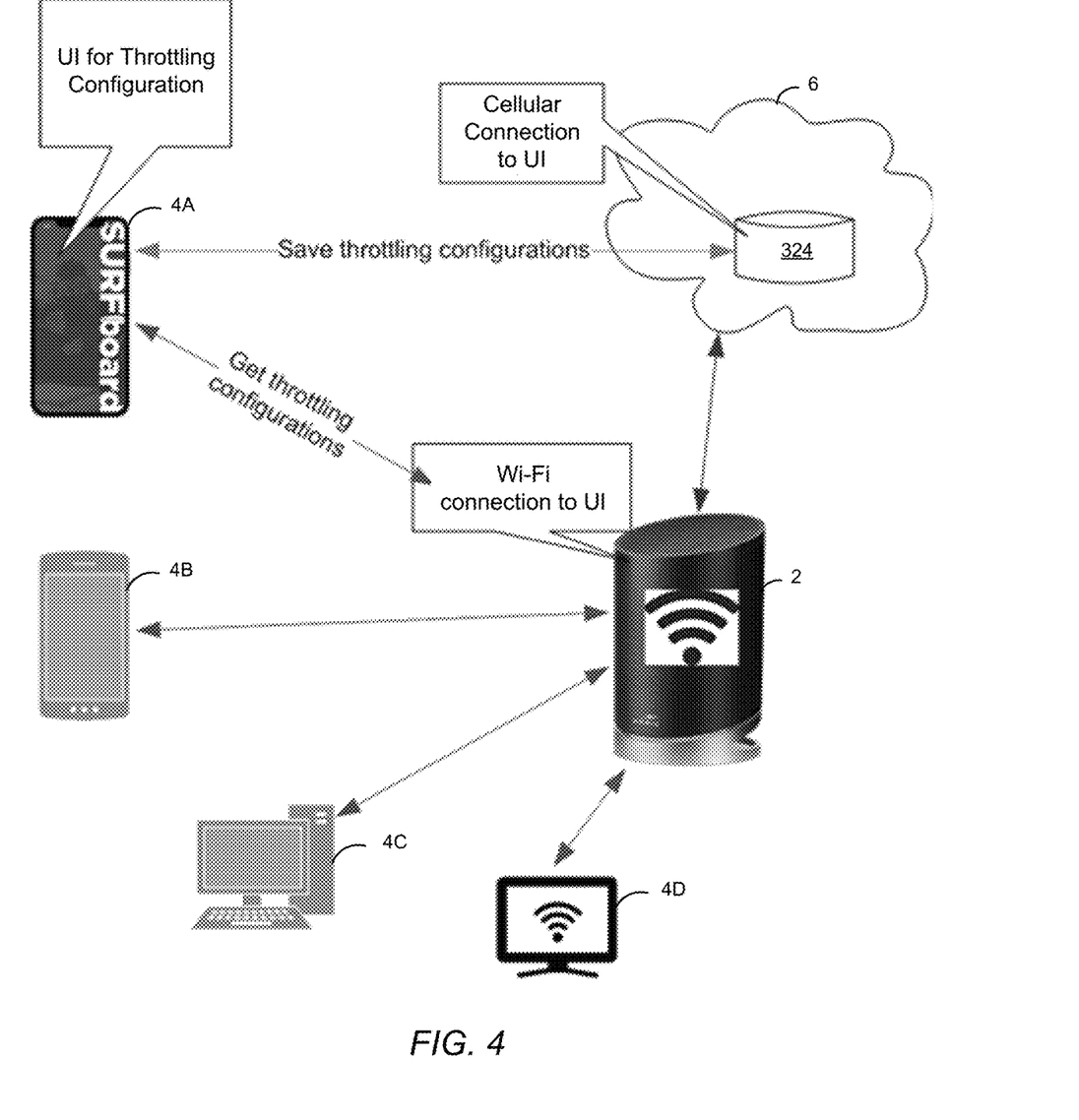
FIG. 4 is an exemplary network environment for providing throttling management of a network, according to one or more aspects of the present disclosure.

FIG. 4 is a more detailed block diagram illustrating certain components of an exemplary access point device 2 implemented in the network environment of FIGS. 1-3, according to an embodiment of the present disclosure. The access point device 2, client devices 4A-4D and network resource 6 of FIG. 3 are similar to the network devices of FIG. 3. Client device 4A includes a user interface for inputting, updating, altering or otherwise managing one or more throttling configurations 320 via a local connection to an access point device 2 and/or a remote connection to a network resource 6. In one or more embodiments, mobile device 4A can interface with the access point device 2 to obtain, update and/or store one or more throttling configurations 320. In one or more embodiments, the client device 4A can interface with a user interface of access point device 2 via a Wi-Fi connection to configure, update, and/or receive one or more throttling configurations 320, a throttling setting 325, or both. In one or more embodiments, mobile device 4A can interface with a network resource 6, for example, with a memory 324, to obtain, update and/or store one or more throttling configurations 320. In one or more embodiments, the client device 4A accesses network resource 6 via a cellular connection to configure, update, and/or receive one or more throttling configurations 320 (including, but not limited to, any of one or more throttling management profiles 321, one or more throttling management parameters 323, one or more throttling factors 325, or any combination thereof), a throttling setting 310, or both.

In one or more embodiments, an access point device 2 comprises a throttling management application, such as software 25, for managing access to an asset such as one or more requests for one or more assets or one or more responses to the one or more requests. For example, a user could utilize a mobile device 4A to initialize or configure the throttling management configuration 320 and/or to enable and/or disable the throttling setting 310. In one or more embodiments, a password, a credential, any other authorization, or a combination thereof can be required to allow a user access to the throttling management configuration 320, a throttling setting 310, or both.

Once the throttling setting 310 is enabled, after appropriate authentication, the throttling management application can monitor a network and apply throttling based on an associated throttling management configuration 320. For example, a network provided by access point device 2 can comprise a variety of network devices, such as client devices 4A-4D. The client devices 4A-4D may be associated with a throttling management configuration 320. The throttling management configuration 320 can be retrieved from a remote network resource 6 by the access point device 2 as illustrated or a memory or storage medium local to the access point device 2. Based on the throttling management configuration 320, a queue, such as queue 500 of FIG. 5, can include a plurality of requests associated with the client devices 4A-4D. For example, the throttling management application can determine based, at least in on part, on the throttling management configuration 320 that personal computer 4C associated with a user should be given priority over IoT device 4D or mobile devices 4A-4B. For example, personal computer 4C can be associated with a parent user for handling one or more critical responses/requests for assets (such as time-sensitive materials, work-related transaction, etc.) while mobile devices 4A-4B and IoT device 4D can be associated with lower priority users (such as children or users requesting entertainment). Thus, responses or requests associated with personal computer 4C will be bumped in the queue if the queue length is of a sufficient length.

Figure 6:
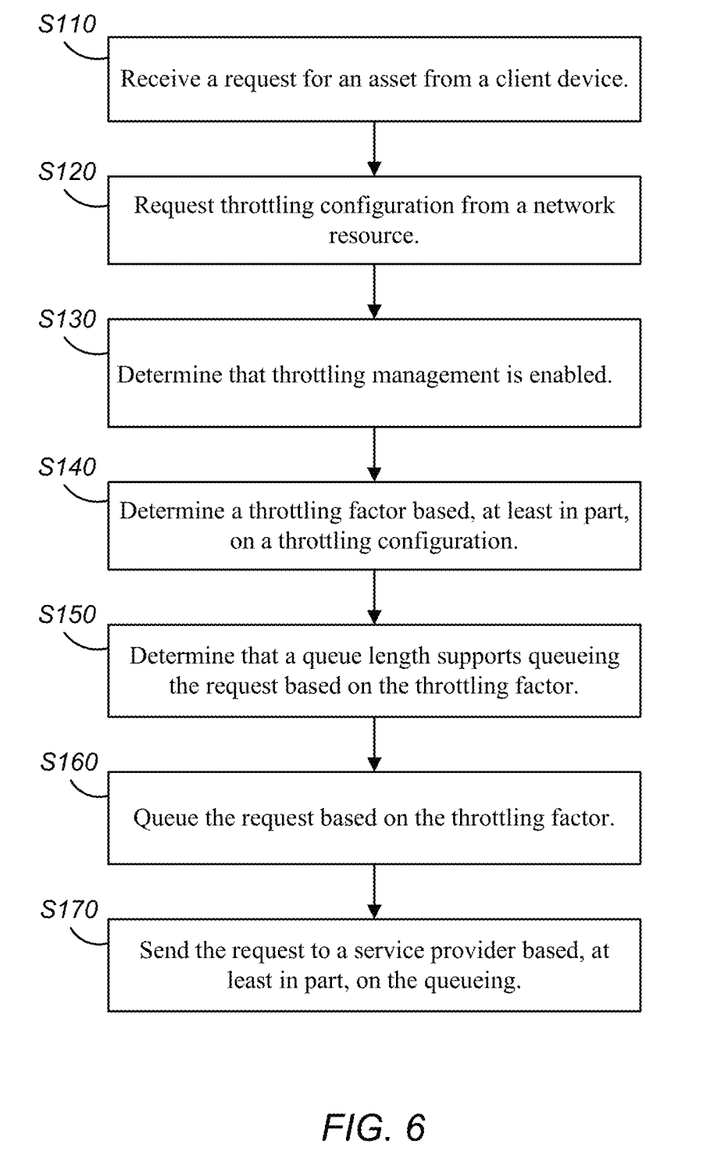
FIG. 6 is a flow chart illustrating a method for providing throttling management of a network, according to one or more aspects of the present disclosure.

FIG. 6 is a flow chart illustrating a method for throttling management of a network, according to one or more aspects of the present disclosure.

The access point device 2 may be programmed with one or more computer-readable instructions such as a throttling management application that when executed by a controller 26 cause the access point device 2 to provide throttling management of one or more network devices according to one or more embodiments so as to provide an enhanced QoE for users of the network. In FIG. 6, it is assumed that any one or more of the devices include their respective controllers and their respective software stored in their respective memories, as discussed above in connection with FIGS. 1-4, which when executed by their respective controllers perform the functions and operations in accordance with the example embodiments of the present disclosure (e.g., including performing a configuration of one or more network devices). While the steps S110-S170 are presented in a certain order, the present disclosure contemplates that any one or more steps can be performed simultaneously, substantially simultaneously, repeatedly, in any order or not at all (omitted).

At step S110, the access point device 2 receives a request for an asset is received from a client device 4 connected to the network. The client device 4 can be associated with a user. The request for an asset can be associated with an application or a particular type of data. In one or more embodiments any number of client devices 4 can be connected to the network and can request any one or more assets.

At step S120, the access point device 2 requests a throttling configuration from a network resource 6, for example, as discussed with reference to FIG. 3. The network resource 6 can be remote from the access point device 2 (for example, accessible via ISP 1) or local to the access point device 2 (for example, accessible via any of memory 24, one or more external network devices coupled to the access point device 2, any other computer-readable storage medium, or combination thereof). The throttling configuration comprises a throttling management parameter and a throttling management profile. The throttling management profile is associated with any of one or more users, one or more applications, one or more network devices, or a combination thereof. In one or more embodiments, a plurality of throttling configurations are associated with any one or more users, one or more network devices, one or more applications, one or more data types, any other network characteristic, or any combination thereof.

At step S130, the access point device 2 determines that throttling management is enabled. In one or more embodiments, step S130 is executed before step S120. In one or more embodiments, a throttling setting (such as stored in memory 24, network resource 6, or any other storage medium) is indicative of whether throttling management is enabled or disabled. In one or more embodiments, the throttling configuration comprises the throttling setting.

At step S140, the access point 2 device determines a throttling factor based, at least in part, on a throttling configuration, for example, as discussed with reference to FIG. 3. This throttling factor is then used at step S150 for the access point device 2 to determine that a queue length of queued requests supports queuing the request received at step S110 based on the throttling factor, for example, as discussed with reference to FIG. 5. In one or more embodiments, the queue length is variable in length, for example, the queue length is based, at least in part, on the number of pending requests from any one or more network devices. In one or more embodiments, the queue length determined can comprise a portion or any one or more portions of the queue. For example, a portion of the queue can be disregarded when determining the length of the queue including, but not limited to, the first request in the queue, the last request in the queue, or both can be disregarded when determining queue length.

At step S160, the access point device 2 queues the request from step S110 based, at least in part, on the throttling factor, for example, as discussed with respect to FIG. 5. In one or more embodiments, the bumping or positioning of the request from step S110 in the queue can also be based, at least in part, on the one or more types of requests in the queue such that the request from step S110 is not bumped or positioned ahead one or more specific types of requests. For example, with reference to FIG. 5C, a request R5 associated with a throttling factor of 5 can be bumped ahead of R4 but the access point device 2 can determine that R2 is associated with the type of request that does not permit bumping and thus R5 can only be bumped ahead of R4 even though the throttling factor indicates a bumping of 500 ms. In one or more embodiments, besides a type of request, the access point device 2 can determine to not bump a request in front of another request based, at least in part, on the user, the application, the network device, or any combination thereof associated with the request.

At step S170, the access point device 2 sends the request received at step S110 to a service provider, for example, ISP 1, based, at least in part, on the queuing of step S160.

According to one or more example embodiments of inventive concepts disclosed herein, there are provided novel solutions for managing, by a throttling management application, requests and/or responses associated with one or more network devices. Based, at least in part, on a throttling management configuration 320, certain requests and/or responses are bumped in a queue so as to provide an enhanced QoE for users of the network, especially a user that requires additional network resources or priority access to network resources.

Each of the elements of the present invention may be configured by implementing dedicated hardware or a software program on a memory controlling a processor to perform the functions of any of the components or combinations thereof. Any of the components may be implemented as a CPU or other processor reading and executing a software program from a recording medium such as a hard disk or a semiconductor memory, for example. The processes disclosed above constitute examples of algorithms that can be affected by software, applications (apps, or mobile apps), or computer programs. The software, applications, computer programs or algorithms can be stored on a non-transitory computer-readable medium for instructing a computer, such as a processor in an electronic apparatus, to execute the methods or algorithms described herein and shown in the drawing figures. The software and computer programs, which can also be referred to as programs, applications, components, or code, include machine instructions for a programmable processor, and can be implemented in a high-level procedural language, an object-oriented programming language, a functional programming language, a logical programming language, or an assembly language or machine language.

The term "non-transitory computer-readable medium" refers to any computer program product, apparatus or device, such as a magnetic disk, optical disk, solid-state storage device (SSD), memory, and programmable logic devices (PLDs), used to provide machine instructions or data to a programmable data processor, including a computer-readable medium that receives machine instructions as a computer-readable signal. By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media.

The word "comprise" or a derivative thereof, when used in a claim, is used in a nonexclusive sense that is not intended to exclude the presence of other elements or steps in a claimed structure or method. As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. Use of the phrases "capable of," "configured to," or "operable to" in one or more embodiments refers to some apparatus, logic, hardware, and/or element designed in such a way to enable use thereof in a specified manner.

While the principles of the inventive concepts have been described above in connection with specific devices, apparatuses, systems, algorithms, programs and/or methods, it is to be clearly understood that this description is made only by way of example and not as limitation. The above description illustrates various example embodiments along with examples of how aspects of particular embodiments may be implemented and are presented to illustrate the flexibility and advantages of particular embodiments as defined by the following claims, and should not be deemed to be the only embodiments. One of ordinary skill in the art will appreciate that based on the above disclosure and the following claims, other arrangements, embodiments, implementations and equivalents may be employed without departing from the scope hereof as defined by the claims. It is contemplated that the implementation of the components and functions of the present disclosure can be done with any newly arising technology that may replace any of the above-implemented technologies. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or

What we claim is:

1. An access point device of a network for providing throttling management comprising:
   a memory storing one or more computer-readable instructions; and
   a processor configured to execute the one or more computer-readable instructions to:
      receive a request for an asset from a client device of the network;
      determine a throttling factor based, at least in part, on a throttling configuration associated with the network, wherein the throttling factor is indicative of a placement in a queue of the request;
      determine a bump, for positioning the request in the queue, based on the throttling factor;
      queue the request in the queue based on the bump, a length of the queue, a type of the request, and one or more throttling management parameters associated with the throttling factor; and
      send the request to a service provider based, at least in part, on the queueing.

2. The access point device of claim 1, wherein the processor is further configured to execute the one or more instructions to:
   request the throttling configuration from a network resource.

3. The access point device of claim 1, wherein the throttling configuration comprises at least one of a throttling management parameter and a throttling management profile.

4. The access point device of claim 3, wherein the throttling management profile is associated with any of one or more users, one or more applications, one or more network devices, or a combination thereof.

5. The access point device of claim 1, wherein queueing the request based on the throttling factor comprises bumping the request by a factor indicated by the throttling factor.

6. The access point device of claim 1, wherein the processor is configured to execute one or more further instructions to:
   determine that throttling management is enabled.

7. The access point device of claim 1, wherein the processor is configured to execute one or more further instructions to:
   determine that a queue length supports queueing the request based on the throttling factor.

8. A method for an access point device of a network to provide throttling management, the method comprising:
   receiving a request for an asset from a client device of the network;
   determining a throttling factor based, at least in part, on a throttling configuration associated with the network, wherein the throttling factor is indicative of a placement in a queue of the request;
   determining a bump, for positioning the request in the queue, based on the throttling factor;
   queueing the request in a queue based on the bump, a length of the queue, a type of the request, and one or more throttling management parameters associated with the throttling factor; and
   sending the request to a service provider based, at least in part, on the queueing.

9. The method of claim 8, further comprising:
   requesting the throttling configuration from a network resource.

10. The method of claim 8, wherein the throttling configuration comprises at least one of a throttling management parameter and a throttling management profile.

11. The method of claim 10, wherein the throttling management profile is associated with any of one or more user one or more applications, one or more network devices, or a combination thereof.

12. The method of claim 8, wherein queueing the request based on the throttling factor comprises bumping the request by a factor indicated by the throttling factor.

13. The method of claim 8, further comprising:
   determining that throttling management is enabled.

14. The method of claim 8, further comprising:
   determining that a queue length supports queueing the request based on the throttling factor.

15. A non-transitory computer-readable medium storing one or more instructions for providing throttling management of a network, which when executed by a processor of an access point device, cause the access point device to perform one or more operations comprising:
   receiving a request for an asset from a client device of the network;
   determining a throttling factor based, at least in part, on a throttling configuration associated with the network, wherein the throttling factor is indicative of a placement in a queue of the request;
   determining a bump, for positioning the request in the queue, based on the throttling factor;
   queueing the request in a queue based on the bump, a length of the queue, a type of the request, and one or more throttling management parameters associated with the throttling factor; and
   sending the request to a service provider based, at least in part, on the queueing.

16. The non-transitory computer-readable medium of claim 15, wherein the one or more instruction when further executed by the processor, cause the access point device to perform one or more further operations comprising:
   requesting the throttling configuration from a network resource.

17. The non-transitory computer-readable medium of claim 15, wherein the throttling configuration comprises at least one of a throttling management parameter and a throttling management profile, and wherein the throttling management profile is associated with any of one or more user one or more applications, one or more network devices, or a combination thereof.

18. The non-transitory computer-readable medium of claim 17, wherein queueing the request based on the throttling factor comprises bumping the request by a factor indicated by the throttling factor.

19. The computer-readable medium of claim 15, wherein the one or more instruction when further executed by the processor, cause the access point device to perform one or more further operations comprising:
   determining that throttling management is enabled.

20. The computer-readable medium of claim 15, wherein the one or more instruction when further executed by the processor, cause the access point device to perform one or more further operations comprising:
   determining that a queue length supports queueing the request based on the throttling factor.

* * * * *